US012206168B2

(12) United States Patent
Zhao

(10) Patent No.: US 12,206,168 B2
(45) Date of Patent: Jan. 21, 2025

(54) MULTI-FREQUENCY SLOT ANTENNAS, TERMINAL DEVICES AND METHODS FOR ADJUSTING RESONANCE FREQUENCIES OF ANTENNAS

(71) Applicant: Anhui Huami Health Technology Co., Ltd., Anhui FTZ (CN)

(72) Inventor: Anping Zhao, Anhui FTZ (CN)

(73) Assignee: Anhui Huami Health Technology Co., Ltd., Anhui FTZ (CN)

( * ) Notice: Subject to any disclaimer, the term of this patent is extended or adjusted under 35 U.S.C. 154(b) by 211 days.

(21) Appl. No.: 17/950,691

(22) Filed: Sep. 22, 2022

(65) Prior Publication Data

US 2023/0008815 A1 Jan. 12, 2023

Related U.S. Application Data

(63) Continuation of application No. PCT/CN2021/095552, filed on May 24, 2021.

(51) Int. Cl.

*H01Q 13/10* (2006.01)
*H01Q 1/22* (2006.01)
*H01Q 5/321* (2015.01)

(52) U.S. Cl.

CPC ............... *H01Q 13/10* (2013.01); *H01Q 1/22* (2013.01); *H01Q 5/321* (2015.01)

(58) Field of Classification Search

CPC ........... H01Q 13/10; H01Q 5/321; H01Q 1/22
See application file for complete search history.

(56) References Cited

U.S. PATENT DOCUMENTS

2019/0097314 A1* 3/2019 Rajagopalan .......... H01Q 13/10

FOREIGN PATENT DOCUMENTS

| | | |
|---|---|---|
| CN | 202282450 U | 6/2012 |
| CN | 104505575 A | 4/2015 |
| CN | 204696231 U | 10/2015 |
| CN | 206236790 U | 6/2017 |

(Continued)

OTHER PUBLICATIONS

International Search Report for International Application No. PCT/CN2021/095552 dated Aug. 9, 2021.

*Primary Examiner* — Graham P Smith
(74) *Attorney, Agent, or Firm* — Young Basile Hanlon & MacFarlane, P.C.

(57) ABSTRACT

Described are electronic devices, and specifically provides a multi-frequency slot antenna, a terminal device and an antenna resonance frequency adjustment method. The antenna is applied to a terminal device, and the terminal device includes a metal casing. According to an example, the antenna includes a slot provided in the metal casing, the slot having a first end and a second end opposite to each other in a length direction; a feed terminal across inside of the slot and located between the first end and the second end; and a capacitor provided in the slot, two electrodes of the capacitor being respectively connected with two sides of the slot in a width direction. Furthermore, in the length direction, the capacitor is located at a position where voltages are not zero at original values of multiple orders of resonance frequencies of the antenna when the capacitor is not provided in the slot. In this way, an operating frequency of the antenna includes multiple orders of resonance frequencies.

19 Claims, 13 Drawing Sheets

(56) References Cited

FOREIGN PATENT DOCUMENTS

| | | | |
|---|---|---|---|
| CN | 107611618 | A | 1/2018 |
| CN | 110718745 | A | 1/2020 |
| CN | 111613893 | A | 9/2020 |
| CN | 212257694 | U | 12/2020 |
| CN | 112490634 | A | 3/2021 |

* cited by examiner

MULTI-FREQUENCY SLOT ANTENNAS, TERMINAL DEVICES AND METHODS FOR ADJUSTING RESONANCE FREQUENCIES OF ANTENNAS

CROSS-REFERENCE TO RELATED APPLICATION(S)

The present application disclosure is a continuation of PCT/CN2021/095552, filed May 24, 2021, which claims priority and benefit of Chinese Patent Application Nos. 202021058362.3 and 202010525777.5, both filed Jun. 10, 2020, the entire disclosures of all of which are hereby incorporated by reference.

TECHNICAL FIELD

The present disclosure relates to the technical field of electronic devices, in particular to multi-frequency slot antennas, terminal devices and methods for adjusting resonance frequencies of antennas.

BACKGROUND

With the development of electronic devices, smart wearable devices can realize more and more functions. Taking a smart watch as an example, it has many functions such as motion assistance, satellite positioning, wireless connection, making calls and so on, and these functions need to be realized by built-in antennas of the watch.

In order to pursue good appearances of devices, more and more smart wearable devices use all-metal casings, and meanwhile use slot antennas to realize antenna functions. A slot antenna refers to a long strip-shaped slot provided in the metal casing, which radiates electromagnetic waves through the feed terminal across the slot. In order to meet the requirements of the operating frequencies of the antennas, lengths of the slots for generating electromagnetic resonances are generally half of the first-order resonance wavelengths. For wearable devices, their volumes are generally small, and design spaces for slot antennas are limited, and it is difficult to meet antenna functions for more frequency bands.

SUMMARY

The implementations of the present disclosure provide multi-frequency slot antennas, terminal devices and methods for adjusting resonance frequencies of antennas.

In a first aspect, implementations of the present disclosure provide a multi-frequency slot antenna applicable to a terminal device with a metal casing. The antenna includes: a slot provided in the metal casing, the slot having a first end and a second end opposite to the first end in a length direction of the slot; a feed terminal provided across the slot and located between the first end and the second end; and a capacitor provided in the slot, two electrodes of the capacitor being respectively connected to two sides of the slot in a width direction of the slot; where an operating frequency of the antenna includes multiple orders of resonance frequencies, the capacitor is located at a position in the length direction where voltages at original values of the multiple orders of resonance frequencies are not zero; and the capacitor is configured to adjust any of the multiple orders of resonance frequencies from an original value to a corresponding target value.

In some implementations, the feed terminal is located at a position close to the first end or the second end. For example, a distance from the feed terminal to one of the first end and the second end is less than a distance from the feed terminal to the other of the first end and the second end. For another example, a distance from the feed terminal to one of the first end and the second end is less than a threshold value, and a distance from the feed terminal to the other of the first end and the second end is more than the threshold value.

In some implementations, the multiple orders of resonance frequencies include a first resonance frequency and a second resonance frequency. A difference between an original value of the first resonance frequency and a target value of the first resonance frequency is a first difference value, and a difference between an original value of the second resonance frequency and a target value of the second resonance frequency is a second difference value. If the first difference value is greater than the second difference value, the capacitor is located in a position where a voltage at the original value of the first resonance frequency is greater than a voltage at the original value of the second resonance frequency.

In some implementations, when the second difference value is greater than the first difference value, the capacitor is located in a position where the voltage at the original value of the first resonance frequency is less than the voltage at the original value of the second resonance frequency.

In a second aspect, implementations of the present disclosure provide a terminal device, including a metal casing, and a first slot antenna and a second slot antenna provided in the metal casing, where at least one of the first slot antenna or the second slot antenna is the multi-frequency slot antenna according to any implementation of the first aspect.

In some implementations, the metal casing includes a bottom casing and a side frame, the first slot antenna and the second slot antenna are provided in the side frame, and slot length directions of the first slot antenna and the second slot antenna are parallel to the bottom casing.

In some implementations, the first slot antenna and the second slot antenna are connected end to end in the side frame.

In some implementations, the first slot antenna includes a GPS L1 antenna, and the second slot antenna includes a GPS L5 antenna and a Bluetooth® antenna.

In some implementations, a shape of the side frame includes one of followings: a circular ring, a rectangle, a rounded rectangle or a diamond.

In some implementations, the terminal device is a wearable device.

In some implementations, the wearable device is a smart watch.

In a third aspect, implementations of the present disclosure provide a method for adjusting a resonance frequency of a slot antenna, where the slot antenna includes a slot provided in a metal conductor, and the method includes: obtaining an original value of a resonance frequency of the slot antenna; obtaining a difference between the original value of the resonance frequency and a corresponding target value of the resonance frequency; providing a capacitor in the slot, where two electrodes of the capacitor are respectively connected to both sides of the slot in a width direction of the slot; and in a length direction of the slot, adjusting a position and/or a capacitance of the capacitor according to the difference to make the resonance frequency of the slot antenna adjusted from the original value to the corresponding target value.

In some implementations, the slot antenna is a multi-frequency slot antenna, and adjusting the position and/or the capacitance of the capacitor according to the difference to make the resonance frequency of the slot antenna adjust from the original value to the corresponding target value includes: determining a difference between an original value of a first resonance frequency of the slot antenna and a target value of the first resonance frequency as a first difference value; determining a difference between an original value of a second resonance frequency of the slot antenna and a target value of the second resonance frequency as a second difference value; adjusting the position of the capacitor according to the first difference value and the second difference value to make the resonance frequency of the slot antenna adjust from the original value of the first resonance frequency to the target value of the first resonance frequency, and from the original value of the second resonance frequency to the target value of the second resonance frequency.

The multi-frequency slot antenna according to the implementations of the present disclosure is applicable to a terminal device, where the terminal device includes a metal casing, where the antenna includes a slot provided in the metal casing, an operating frequency of the antenna includes multiple orders of resonance frequencies. A feed terminal is provided in the slot as an antenna excitation source, and a capacitor is provided in the slot, where in a length direction, the capacitor is located at a position where voltages at original values of the multiple orders resonance frequencies are not zero. By providing a capacitor at a position where a radio wave voltage distribution value is not zero, an effective electrical length of the slot is extended, in this case, for a same operating frequency, a physical length of the slot required by the antenna is shorter, and a space occupied by the antenna structure is reduced. By adjusting the position of the capacitor, a frequency multiplication relationship of multi-order resonance can be adjusted, and original values of the multiple orders of resonance frequencies can be adjusted to available operating frequencies, and multiple frequencies can be achieved by using one antenna structure. Moreover, during adjusting of the multiple orders of resonance frequencies, by adjusting a position of the capacitor in the region of the voltage distribution at the first resonance frequency and the second resonance frequency, the adjustment of first resonance frequency and the second resonance frequency can be achieved.

In the multi-frequency slot antenna according to the implementations of the present disclosure, the feed terminal is provided close to the first end or the second end of the slot, and the feed terminal is disposed at a position of the slot close to one of ground terminals, so that a length of the slot is most effectively used, and it is convenient to optimize a return loss of the antenna and improve the performance of the antenna. In addition, if the feed terminal is disposed close to the ground end, the antenna can excite more orders of the resonance frequencies, which facilitates an adjustment and optimization of the multi-frequency antenna, such as optimizing and adjusting an input impedance of each mode of the antenna.

The terminal device according to the implementations of the present disclosure includes an annular metal casing, and the metal casing is provided with a first slot antenna and a second slot antenna annularly, at least one of the first slot antenna or the second slot antenna is the above-mentioned multi-frequency slot antenna, so that an effective length of the slot antenna can be extended, and a physical length of the slot is greatly shortened for a same operating frequency. By adjusting the frequency multiplication of the multi-order resonance by the capacitor, a multi-frequency antenna can be achieved by using one antenna structure, which can be used on wearable devices with limited volume to implement more antenna frequencies, such as dual-band GPS positioning antennas, Bluetooth®, and/or multi-band 4G and 5G antennas on wearable devices, which are generally not possible for regular-sized smartwatches. Taking a smart watch as an example, the first slot antenna of the smart watch is a GPS L1 antenna, and the second slot antenna is a multi-frequency slot antenna including a GPS L5 and a Bluetooth antenna. Using the slot antenna of the present disclosure, the multi-frequency antenna with GPS L5 and Bluetooth can be realized, so that dual-band GPS and Bluetooth antenna generally impossible to be realized can be designed in a smart watch with a limited volume, which enriches device functions and improves user experience.

The method for adjusting the resonance frequency of the slot antenna according to the implementations of the present disclosure includes obtaining an original value of a resonance frequency of the slot antenna without a capacitor, providing a capacitor in the slot, and adjusting a position and/or a capacitance of the capacitor to adjust the resonance frequency of the slot antenna from the original value to a corresponding target value of the resonance frequency. Therefore, when the slot length is limited, using the capacitor can realize a lower frequency antenna structure, and the capacitor can also be configured to adjust the frequency multiplication relationship between multiple orders of resonances, so as to realize an optimal design of the multi-frequency antenna.

BRIEF DESCRIPTION OF DRAWINGS

In order to explain the technical solution in the implementations of the present disclosure more clearly, drawings used in the description will be briefly introduced below.

DETAILED DESCRIPTION

Figure 1:
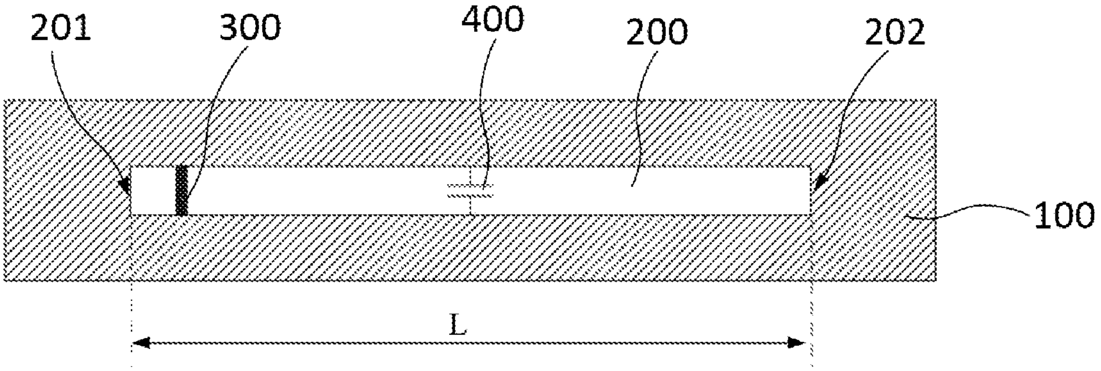
FIG. 1 is a schematic diagram of an antenna structure according to implementations of the present disclosure.

The technical solutions of the present disclosure will be clearly and completely described below with reference to the accompanying drawings. Obviously, the described implementations are a part of the implementations of the present disclosure, but not all of the implementations. Based on the implementations in the disclosure, all other implementations obtained by those skilled in the art without making creative work fall into the protection scope of the disclosure. In addition, the technical features involved in different implementations of the present disclosure described below can be combined with each other as long as they do not conflict with each other.

A slot antenna refers to an antenna formed by providing a slot in a conductor surface. A typical shape of the slot is a long strip, and a feed terminal provided across the slot serves as an excitation source of the antenna. A working principle of the slot antenna is similar to that of a dipole antenna. Generally, a length of the slot is half of the wavelength for a first-order resonance frequency of the antenna, and a slot length L of the slot antenna and a wavelength λ for an operating frequency of the antenna, such as, for example, a first-order resonance frequency, has following relationship:

$$L = \frac{1}{2}\lambda = \frac{1}{2} \cdot \frac{C}{f} \tag{1}$$

In formula (1), C represents a speed of light, and f represents the first-order resonance frequency. It can be seen from formula (1) that the length L of the slot is inversely proportional to the operating frequency f of the antenna, that is, the lower the operating frequency of the antenna is, the longer a required slot length is.

Taking an L1 band of a GPS (global positioning system) satellite positioning antenna as an example, its operating central frequency is 1.575 GHz, and a half of the wavelength for the operating central frequency in free space is about 95 mm. Although the wavelength can be reduced by filling a slot with injection molded materials, a slot length of nearly 100 mm is still unacceptable for most wearable devices.

In addition, it should be noted that in order to realize communications between the wearable device and mobile terminals, the wearable device need to have a short range wireless (e.g., a Bluetooth®) antenna, and even some devices further have communication antennas such as 4G LTE (Long Term Evolution) or 5G antenna. Numerous antennas make the antenna design of wearable devices more difficult. Therefore, how to extend an effective electrical length of a slot antenna and to reduce an opening length of a slot is a technical problem that needs to be solved urgently.

In a first aspect, in order to solve the above technical problems, an antenna structure is provided according to implementations of the present disclosure. The antenna structure can be applicable to a terminal device, where the terminal device can be any device with a slot antenna structure, such as a smart phone, a smart watch, a smart wristband, or the like. The antenna structure according to the implementations of the present disclosure aims to extend an effective electrical length of a slot antenna, thereby reducing a physical length of a slot, so that the antenna structure can achieve a better effect on a terminal device with a relatively small volume, such as, for example, a wearable device. Furthermore, the antenna structure of the present disclosure is also applicable to any other device having a slot antenna, and can also achieve the same effect, which is not limited in the present disclosure.

In some implementations, the antenna structure of the present disclosure includes a slot provided in a metal casing of the terminal device, and in a length direction of the slot, the slot has a first end and a second end opposite to the first end. A feed terminal is provided across the slot and located between the first end and the second end. A capacitor is provided across the slot, that is, two electrodes of the capacitor are respectively connected at both sides of the slot in a width direction. In the length direction of the slot, the capacitor is located at a position where a voltage at an operating frequency of the antenna structure is not zero.

In the design of the antenna structure of the present disclosure, by providing a capacitor in the slot antenna, for a same slot length, the effective electrical length of the slot antenna can be extended and the operating frequency of the antenna can be reduced. In other words, for achieving the same operating frequency, the physical length of the slot can be reduced by adopting the antenna structure of the present disclosure.

For ease of understanding, the solution of the present disclosure is described herein. A generation of resonance of the slot antenna is essentially similar to that of a resonance circuit. Providing a capacitor across the slot antenna is equivalent to increasing a capacitance of the resonance circuit, thereby correspondingly reducing the resonance frequency of the slot antenna. The reduction of the resonance frequency is equivalent to extending the effective electrical length of the slot antenna. For a same resonance frequency, the slot length of the antenna structure of the present disclosure can be smaller.

With reference to an implementation shown in FIG. 1, how the antenna structure of the present disclosure can increase the effective electrical length of the slot will be further described hereinafter. For ease of understanding, in this implementation, the antenna structure is a single frequency antenna for example, and an available frequency is only the first-order resonance frequency of the antenna.

As shown in FIG. 1, in this implementation, the antenna structure includes a slot 200 provided in a metal casing 100, and a left ground end and a right ground end of the slot are a first end 201 and a second end 202, respectively. A feed terminal 300 is provided across the slot 200 as an excitation source of the antenna.

Figure 2:
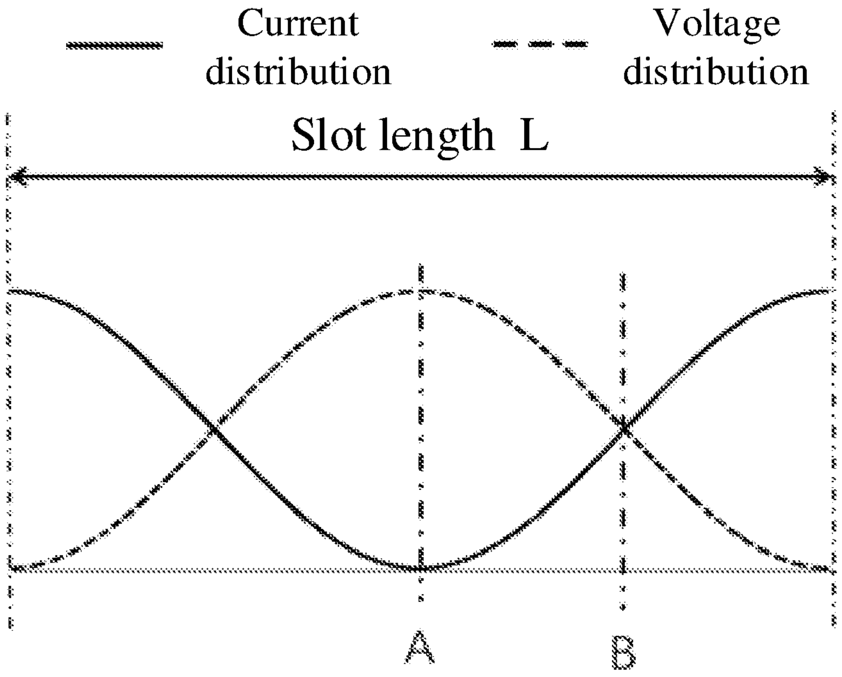
FIG. 2 is diagram illustrating current and voltage distribution curves of an antenna structure in FIG. 1 at an operating frequency.

If a capacitor 400 is not provided, the feed terminal 300 and the slot 200 form a conventional slot antenna. FIG. 2 is a schematic diagram illustrating a voltage distribution and a current distribution of the slot antenna at the first-order resonance frequency. Since a length L of the slot 200 is half of the wavelength of the first-order resonance frequency, a current of the slot antenna at the first-order resonance frequency reaches the maximum at both ends of the slot 200 and is zero at the middle position of the slot 200. The voltage distribution is opposite to the current distribution, that is, a voltage of the slot antenna at the first-order resonance frequency is zero at both ends of the slot 200 and reaches the maximum at the middle position of the slot 200.

According to the operating principle of the capacitor, the larger a voltage difference applied to two electrodes/poles of the capacitor is, the more obvious a frequency reduction effect produced by the capacitor is. It can be seen that, if the capacitor 400 is located at a position where the voltage is 0 at the first-order resonance frequency, the frequency reduction effect will not be produced. In addition, if the voltage at the first-order resonance frequency is larger at the position of the capacitor 400, the first-order resonance frequency of the antenna is shifted more toward the lower frequency, and the increment of the effective electrical length of the antenna is larger.

Continuing to refer to FIG. 2, point A is a midpoint of the slot 200, and point B is a quarter point of the slot 200. It can be seen that, at the first-order resonance frequency, the voltage at point A is the maximum, and the voltage at point B is less than that at point A. In the following examples, the capacitor 400 is provided at positions of point A and point B, respectively, so as to explore a variation of the effective electrical length of the antenna structure in the implementation of FIG. 1.

Figure 3:
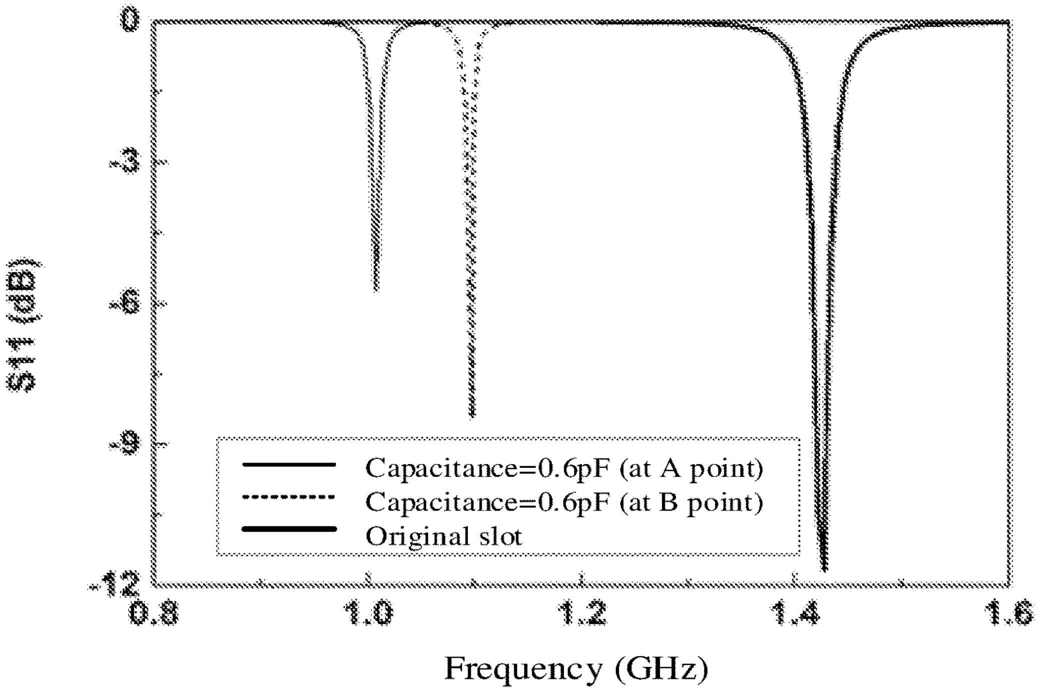
FIG. 3 shows return loss curves of an antenna when a capacitor is located at point A and point B, respectively.

FIG. 3 shows variation curves of the parameter S (i.e., return loss) of the antenna when the capacitor 400 is disposed at point A and point B, respectively. It can be seen from FIG. 3 that, when a same capacitor with a capacitance of 0.6 pF is applied at different positions of point A and point B, a frequency shift effect at point A is better than that at point B, and the first-order resonance frequency decreases more for the capacitor 400 placed at point A than at point B. Therefore, the above conclusion can be confirmed, that is, in a case of the same capacitance, the larger the voltage at a disposing position of the capacitor 400 at the first-order resonance frequency, the greater an offset of the first-order resonance frequency of the antenna shifted toward the lower frequency, and the greater the increment of the effective electrical length of the antenna.

Figure 4:
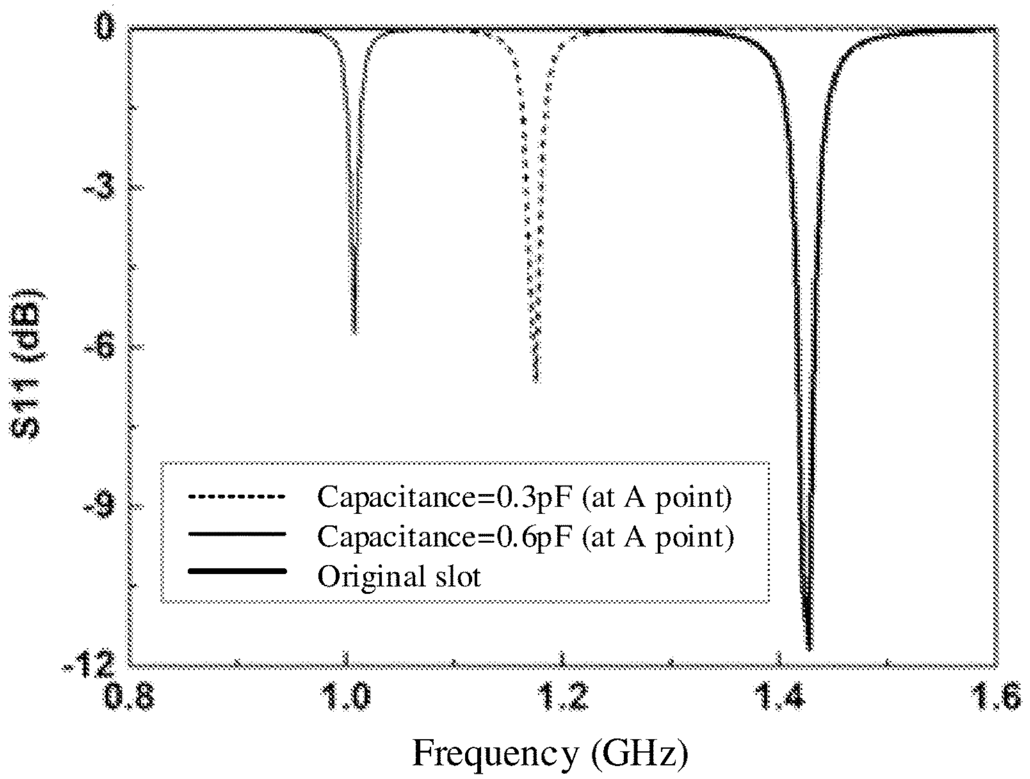
FIG. 4 shows return loss curves of an antenna when capacitors with different capacitances are located at point A respectively.

On this basis, the effect of different capacitances on the antenna performance is further explored. FIG. 4 shows variation curves of parameter S (i.e., return loss) of the antenna when the capacitor 400 with different capacitances is provided at point A respectively. It can be seen from the results in FIG. 4 that, while the capacitor 400 is at a same position, such as, for example, point A, the larger the capacitance of the capacitor 400, the greater an offset of the first-order resonance frequency of the antenna shifted to the lower frequency. It can be seen that in the design of the slot antenna, in the case that the slot length is not enough, the effective electrical length of the slot antenna can be extended by applying a capacitor with a large capacitance. However, since the capacitance is inversely proportional to the efficiency of the antenna, that is, the larger the capacitance value is, the lower the efficiency of the antenna is. Therefore, from a viewpoint of the efficiency, a small capacitance should be used. In other words, the capacitance cannot be too large, so as to ensure the antenna performance while extending the effective electrical length of the slot antenna.

It can be seen from the above examples that, in a condition that the antenna efficiency is maximized, or that the capacitance of the capacitor 400 is a fixed value, if the position of the capacitor 400 is closer to a position where the voltage at the operating frequency of the antenna is the maximum, the effective electrical length of the slot antenna is longer. For example, in the implementation shown in FIG. 1, the shifting of the operating frequency of the antenna toward the lower frequency achieves the best effect when the capacitor 400 is disposed at the midpoint position of the slot.

Still taking the implementation shown in FIG. 1 as an example, according to the above-mentioned description, during the design of the antenna structure, two directions are considered.

a) Under a condition that the length of the slot 200 is a fixed value, by adjusting the position of the capacitor 400 in the slot, the operating frequency of the antenna structure is shifted toward the lower frequency. In this way, without changing the length of the slot 200, the operating frequency of the antenna structure is reduced to a target frequency. Moreover, if the position of the capacitor is fixed, a larger capacitance of the capacitor can achieve a more obvious effect for reducing the operating frequency of the antenna structure, which will be described in detail below.

b) The capacitor 400 is fixed at the midpoint of the slot 200, and the length L of the slot 200 is adjusted to make the operating frequency of the antenna structure to be the target frequency. In this case, the length of the slot 200 is the shortest slot length at the target frequency, thereby reducing the space occupied by the antenna.

The design of the antenna structure of the present disclosure are further described below with reference to a specific example of the wearable device.

Taking the wearable device to be a smart wristband with all-metal casing as an example. Smart wristbands are mainly used for physiological parameter monitoring and motion assistance. In order to communicate with a phone, the wristband includes a Bluetooth antenna. In order to realize motion trajectory detection, the wristband generally further includes a satellite positioning antenna. In this implementation, for example, a smart wristband includes a Bluetooth antenna at 2.4 GHz and a GPS satellite positioning antenna at 1.575 GHz for description.

Figure 5:
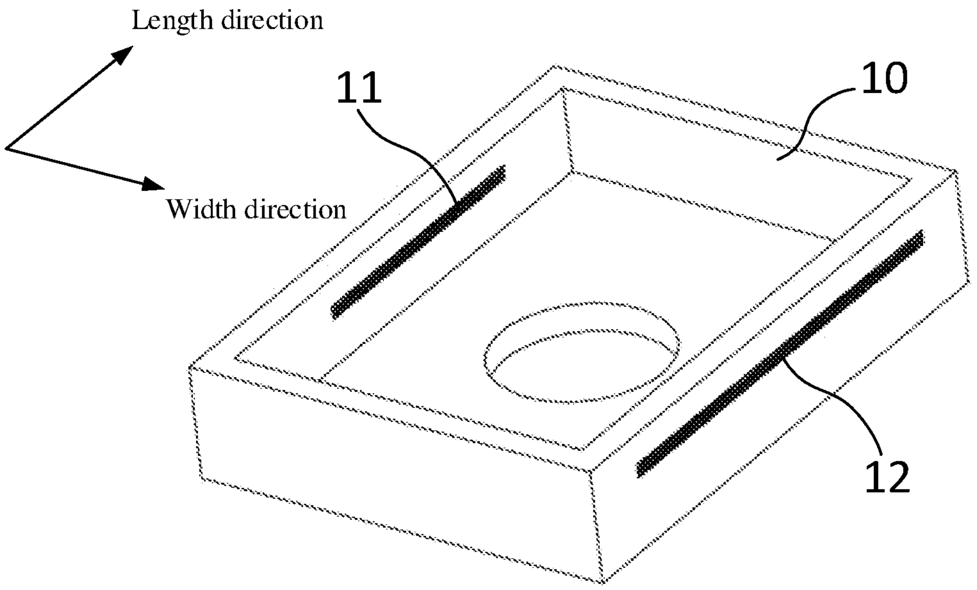
FIG. 5 is a schematic diagram of an antenna structure according to implementations of the present disclosure.

As shown in FIG. 5, a metal casing 10 of the smart wristband is shown. The metal casing 10 includes a bottom casing disposed horizontally, and a side frame perpendicular to the bottom casing and surrounding edges of the bottom casing. In the implementation of the present disclosure, a slot antenna is provided in the side frame. For the wristband, a heart rate window needs to be disposed on the lower surface of the metal casing, and two sides in the width direction are configured to connect a metal wristband. The metal wristband may shield the antenna, so the Bluetooth antenna 11 and the satellite positioning antenna 12 of the wristband can only be arranged at two sides of the metal casing 10 in the length direction. Taking a conventional wristband as an example, a length of the metal casing 10 is about 58 mm, and a width of the metal casing 10 is about 20 mm.

During the design of the Bluetooth antenna and the satellite positioning antenna, considering the length of the metal casing being about 58 mm, as well as the structural strength and placement of internal components, the maximum length of the slot that can be disposed is about 50 mm. It can be seen from the foregoing that, a half of the wavelength of the first-order resonance frequency of the satellite positioning antenna (i.e., 1.575 GHz) is about 95 mm. Although the effective electrical length of the slot antenna can be extended by filling the slot with injection molded nanomaterials with a dielectric constant of 3.0, which still cannot meet the operating frequency requirements of the satellite positioning antenna.

Figure 6:
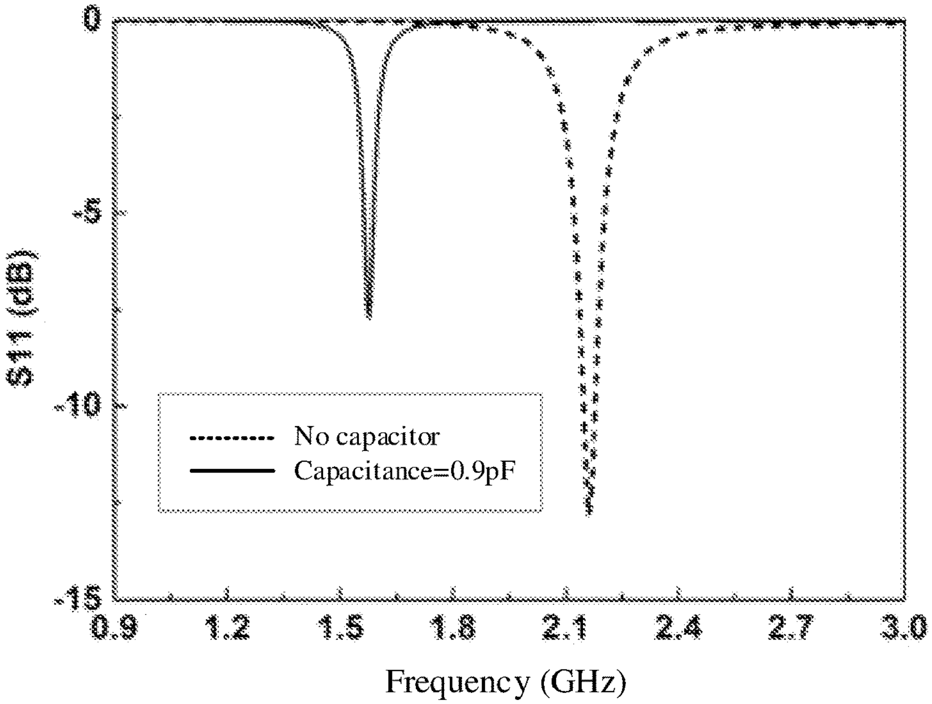
FIG. 6 shows return loss curves before and after a capacitor is provided across a slot antenna.

FIG. 6 shows return loss curves of an antenna of a wristband before and after a capacitor is provided across in the slot. It can be seen that when there is no capacitor in the slot, the first-order resonance frequency of the antenna is about 2.16 GHz, which obviously cannot meet the requirement of GPS satellite positioning antenna. But when a capacitor of 0.9 pF is provided in the middle position of the slot, the first-order resonance frequency of the antenna is shifted to about 1.575 GHz, which meets the design requirement of the satellite positioning antenna. It can be calculated from the above two frequencies that, if the capacitor of 0.9 pF is arranged, the effective electrical length of the slot is equivalent to being extended by about 37%, which greatly extends the effective electrical length of the slot antenna.

Figure 7:
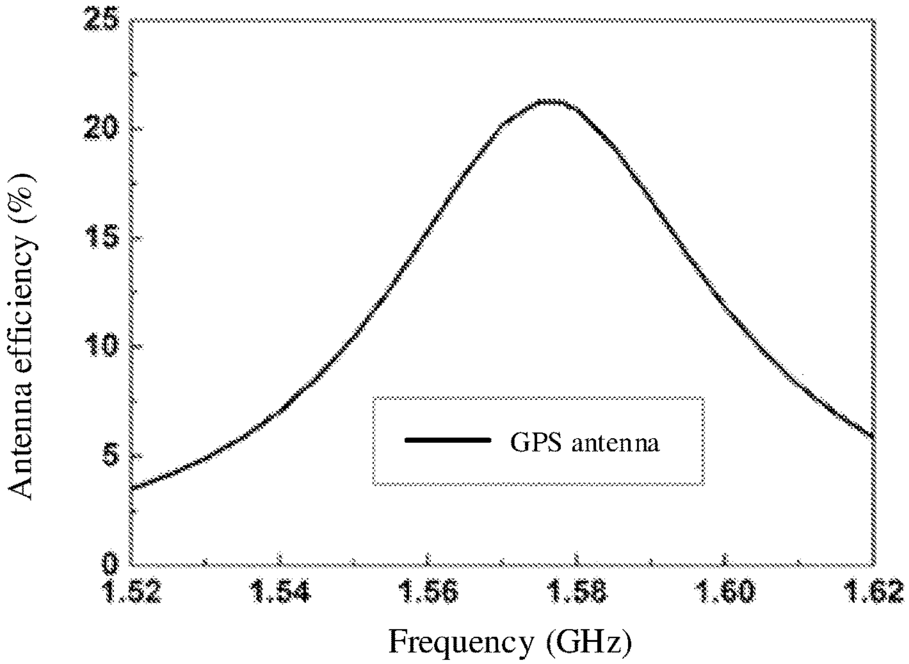
FIG. 7 shows an efficiency curve of an antenna structure according to implementations of the present disclosure.

FIG. 7 shows an efficiency curve of a satellite positioning antenna 12, such as a GPS satellite position antenna. At an operating frequency of the satellite positioning antenna 12, an efficiency of the antenna is greater than 20%, which can meet a performance requirement of the satellite positioning antenna. It can be seen from the above results that, by providing a slot in the metal casing 10 of the all-metal wristband and arranging a capacitor in the slot, the design of the satellite positioning antenna 12 of the all-metal wristband of this implementation becomes feasible. In addition, simulation results show that even in the case that the wristband is worn on an arm, a radiation efficiency of the satellite positioning antenna 12 is still higher than 20%, which shows that the antenna structure proposed in this implementation also has good antenna performance in actual use.

The design of the satellite positioning antenna 12 has been described in detail above, and the physical length of the slot of the Bluetooth antenna 11 can also be reduced by using the above antenna structure. In other implementations, since the operating frequency of the Bluetooth antenna 11 is higher than that of the satellite positioning antenna 12, the slot length of the Bluetooth antenna 11 is much shorter than that of the satellite positioning antenna 12. Therefore, the Bluetooth antenna can be designed directly in a side space of the wristband casing without using the above-mentioned antenna structure, which is not limited in the present disclosure.

It can be seen from the above-mentioned description that the antenna structure according to the implementations of the present disclosure greatly extends the effective electrical length of the slot antenna, reduces the physical length of the slot of the antenna structure, makes it possible to design a plurality of antennas in a relatively small all-metal terminal device, and enriches performances of the device.

After understanding the principle of the antenna structure in the implementations of the present disclosure, the design of the multi-frequency antenna can be further implemented on the basis of the above-mentioned considerations.

Based on the principle of the slot antenna, it can be known that if the slot antenna is fed through a feed terminal, multiple orders of resonance frequencies can be generated in the slot antenna, and the multiple orders of resonance frequencies have a frequency multiplication relationship. For a single-frequency antenna, the first-order resonance mode (i.e., the fundamental mode) of the multiple orders of resonances only is generally available. The "multi-frequency antenna" mentioned in the present disclosure refers to that, for one antenna structure, multiple orders of resonance frequencies are available. For example, for one slot antenna, the first-order resonance frequency is about 1.176 GHz, and the second-order resonance frequency is about 2.4 GHz, then the slot antenna can be used as an L5 antenna of GPS satellite positioning antenna and a Bluetooth, which greatly simplifies an antenna structure of the device.

It can be seen from the foregoing that the multiple orders of resonance frequencies of the slot antenna have a frequency multiplication relationship, and the multiple orders of resonance frequencies cannot be directly used in most cases. For example, if the frequency multiplication relationship of the slot antenna is an odd multiple, it is assumed that the first-order resonance frequency is 1.176 GHz, and the second-order resonance frequency reaches 3.5 GHz, which exceeds an available frequency band.

Based on the above-mentioned principles, the implementations of the present disclosure further realize the design of the multi-frequency antenna by providing a capacitor connected across in the slot antenna, which will make it possible to realize the antenna structure originally impossible for the device with a relatively small volume.

First of all, the slot antenna includes ground points located at two sides of the slot and a feed terminal in the slot. In theory, the feed terminal being located at any position between the two ground points can realize the antenna function. However, since in the case of the feed terminal located close to one of the ground points, the slot length can be used most effectively, and it is convenient to optimize the return loss of the antenna and improve the performance of the antenna, the feed terminal is located close to one of the ground points. For example, a distance between the feed terminal and one ground terminal is less than that between the feed terminal and the other ground terminal. For another example, a distance between the feed terminal and one ground terminal is less than a specific value.

After further research, it is discovered that the position of the feed terminal in the slot also affects multi-order resonance of the antenna. This is because that, for multiple orders of resonance frequencies of the antenna, current distributions at the position of the feed terminal are not zero. If the feed terminal is located at the middle of the slot antenna, only odd times of the resonance frequency can be excited. However, if the feed terminal is located close to one of the ground points, more resonance frequencies can be excited, and the first several orders of frequency multiplication of the resonance frequencies is ensured to be present, which is convenient for adjusting and optimizing the first two or first three orders of the resonance frequencies of the multi-frequency antenna. Therefore, in the following implementations of the present disclosure, the antenna structure is still as shown in FIG. 1, and the feed terminal 300 is provided at a position close to the first end 201 or the second end 202 of the slot 200.

In order to facilitate intuitive understanding of the solution of the present disclosure, the solution of the present disclosure will be described below with reference to a specific implementation. In this implementation, the terminal device is described as a smart watch with an all-metal casing as an example.

Figure 8:
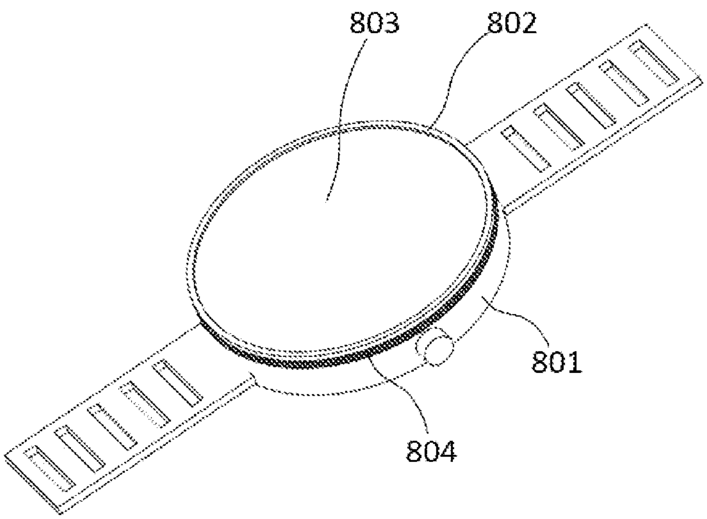
FIG. 8 is a schematic diagram of a smart watch according to implementations of the present disclosure.

FIG. 8 shows a smart watch with an all-metal casing. The all-metal casing refers to that a side frame and a bottom casing of the watch are integrally-connected metal, and the metal casing shields the antenna radiation. In order to realize the antenna structure of the all-metal casing, an annular slot 804 is (also referred to as "slot 804" herein) provided in the metal casing of the watch, and the metal casing is divided into a metal middle frame 801 and a metal face frame 802 which are independent with each other. The slot 804 between the metal middle frame 801 and the metal face frame 802 is configured as the slot of the antenna structure, and is sealed by nano-filling materials. A plurality of antennas of the smart watch can be connected end to end sequentially in the slot 804, and the plurality of slot antennas can be realized by using slots with different arc lengths, respectively. It can be seen that the maximum space for disposing the antennas in the smart watch is an entire circumferential arc length space of the slot 804 parallel to the bottom casing. The positions of slot openings of the plurality of antennas are connected end to end in the slot 804. In the present disclosure, "connected end to end" refers to that, if there are a plurality of antennas, the plurality of antennas are sequentially arranged in a circumferential direction of the slot 804. In actual implementation, a length of the slot antenna opening can be configured according to an antenna performance, which can be the entire circumference of the slot 804, or a part of the circumference arc length of the slot 804. The metal face frame 802 refers to an annular metal frame that is provided around the watch screen 803.

Smart watches can include a Bluetooth antenna and a GPS satellite positioning antenna. A central operating frequency of the Bluetooth antenna is 2.44 GHz. A civilian frequency bands of the GPS satellite positioning antenna include an L1 frequency band and an L5 frequency band. A central operating frequency of L1 is 1.575 GHz, and a central operating frequency of L5 is 1.176 GHz. It can be seen from a calculation that, a length of the Bluetooth antenna should be half of the wavelength of a wave of its central operating frequency in free space, that is, about 60 mm, and a length of the GPS satellite positioning antenna should be half of the wavelength of an L1 wave in free space, that is about 95 mm. For a typical smart watch, a diameter of the metal casing does not exceed 50 mm. In a case of filling the slot with a dielectric material, the Bluetooth antenna and the GPS L1 antenna can be made by using the entire circumferential space.

Figure 9:
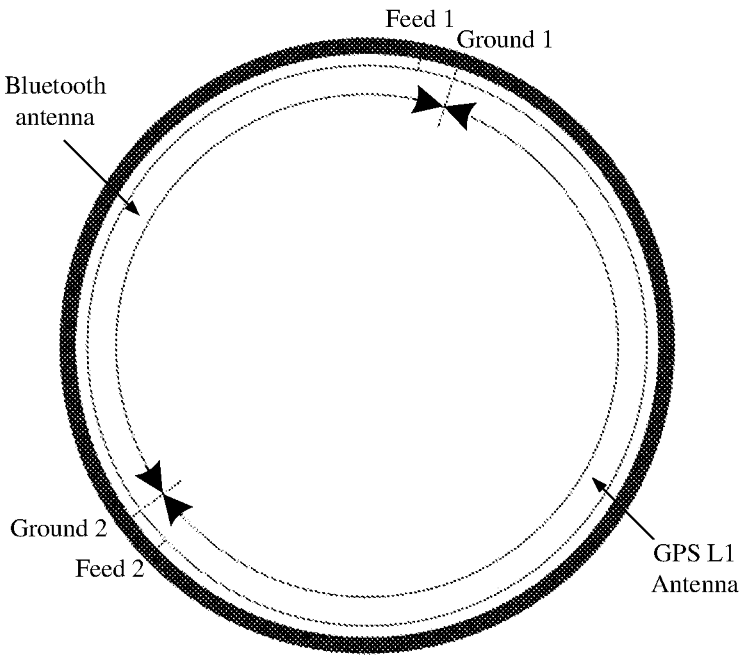
FIG. 9 is a schematic structural diagram of an example antenna structure of a smart watch.

As shown in FIG. 9, the antenna structure of the watch can be referred to as shown in FIG. 9. In an entire ring-shaped slot, the slot is divided into a Bluetooth antenna on the left and a GPS L1 antenna on the right by using two grounding points, Ground 1 and Ground 2. That is, the arc segment of "Ground 1-Feed 1-Ground 2" is configured as the Bluetooth antenna, and the arc segment of "Ground 2-Feed 2-Ground 1" is configured as the GPS L1 antenna.

It can be seen that, only the Bluetooth antenna and the GPS L1 antenna can be arranged in the housing space of the watch, and there is no space left to arrange a GPS L5 antenna. Since a satellite coverage ratio of the L1 frequency band is relatively large, a single-frequency GPS antenna usually uses the L1 frequency band as the basic GPS operating frequency band, that is, the single-frequency GPS antenna is an antenna that supports only the L1 frequency band. A dual-frequency GPS antenna supports both L1 and L5 frequency bands, the L1 frequency band is configured as the basic frequency band, and the L5 frequency band is configured as an auxiliary frequency band, which can eliminate an ionospheric error and greatly improve a positioning accuracy.

It can be seen from the above calculations that as shown in FIG. 8, if the Bluetooth antenna, the GPS L1 antenna and the GPS L5 antenna are provided in the smart watch simultaneously, the diameter of the watch needs to be increased by more than 80%, which is obviously not suitable for the watch.

Based on the above-mentioned considerations, in the implementations of the present disclosure, a Bluetooth antenna and a dual-frequency GPS antenna can be designed without increasing a size of the watch, or even in a smaller watch size.

The consideration of the implementations of the present disclosure is that by providing a capacitor across the slot antenna, multiple orders of resonance frequencies are adjusted to make both the first-order resonance frequency and the second-order resonance frequency of one slot antenna be available. For example, one slot antenna is configured to realize a GPS L5 antenna and a Bluetooth antenna, which will be described in below.

Figure 10:
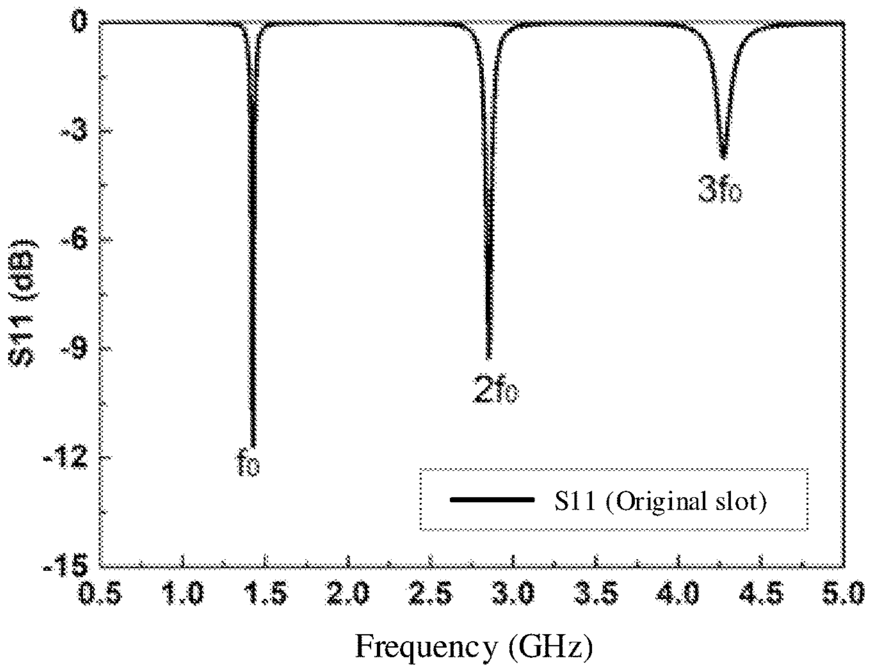
FIG. 10 shows return loss curves of a slot antenna at first three order resonance frequencies.
Figure 11:
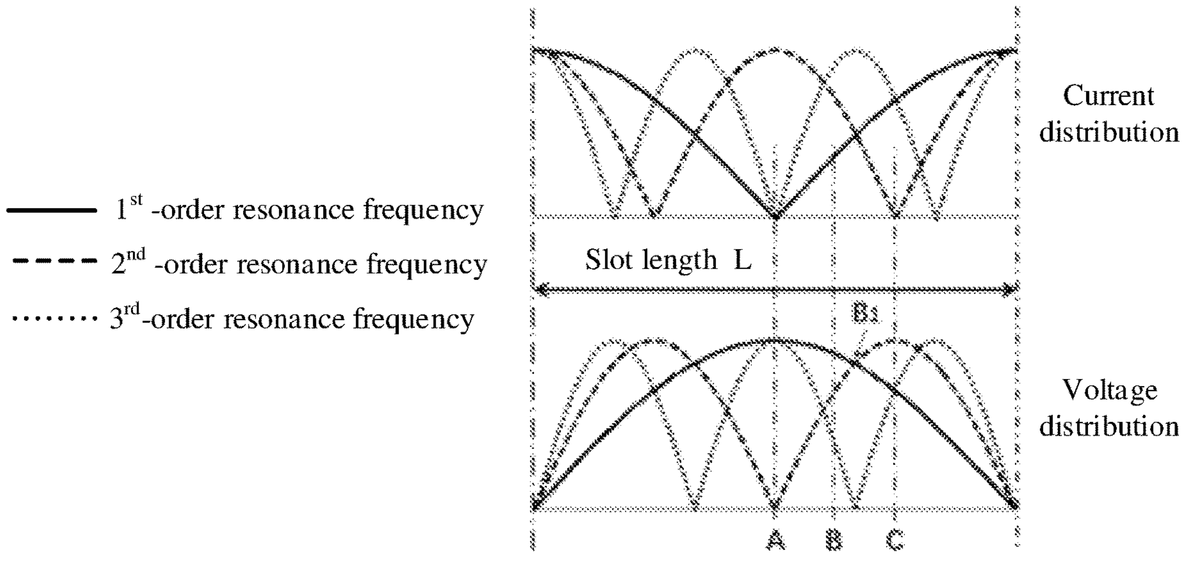
FIG. 11 shows current and voltage distribution curves of a slot antenna at first three order resonance frequencies.

First, a reference antenna with a slot length of L is defined, the reference antenna is a conventional slot antenna, and its structure can refer to FIG. 1, but no capacitor is connected across the slot. Since a feed terminal is close to one of the grounding points, resonance frequencies generated by the reference antenna have following characteristic: a slot length of the antenna is ½ wavelength of the first-order resonance frequency $f_0$ of the antenna, the second-order resonance frequency of the slot antenna is approximately $2f_0$, and the third-order resonance frequency of the slot antenna is approximately $3f_0$. That is, the resonance frequencies of the antenna have a characteristic of frequency multiplication. FIG. 10 shows return loss curves of the reference antenna at the first three orders of the resonance frequencies. FIG. 11 shows current and voltage distribution curves of the reference antenna at first three order resonance frequencies.

Referring to the voltage and current distribution shown in FIG. 11, it can be seen that for a same slot length, the voltage has a maximum value at a position where the current is the minimum, and vice versa. Based on the above-mentioned considerations, in order to adjust an original resonance frequency of the reference antenna, a capacitor is bridged in the slot. In order to better understand how the resonance frequency of the slot antenna is adjusted according to the position of the capacitor, capacitors are disposed at point A, point B, and point C as shown in FIG. 11, respectively. At the first-order resonance frequency of the reference antenna, point A is a position where the current is zero and the voltage is the maximum. at the second-order resonance frequency of the reference antenna, point C is a position where a current is zero and the voltage is the maximum on a right side; point B is the midpoint of point A and point C.

Figure 12:
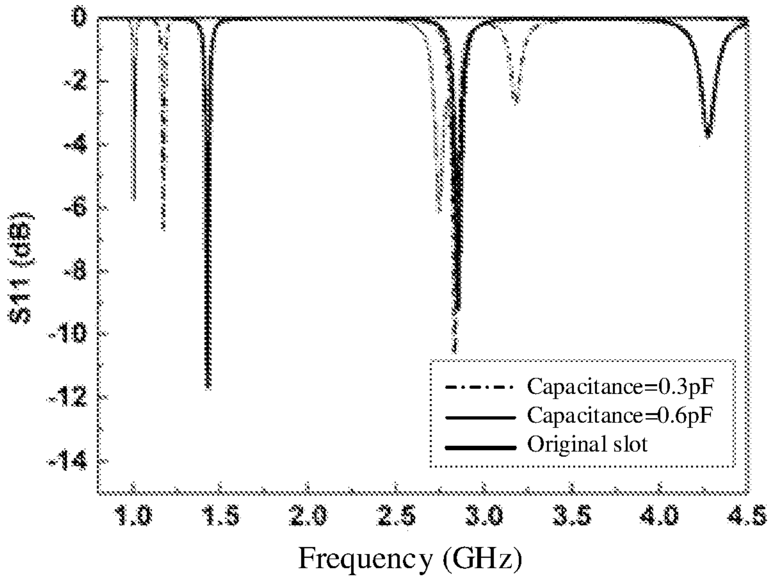
FIG. 12 shows return loss curves at first three order resonance frequencies when a capacitor is provided across point A.
Figure 13:
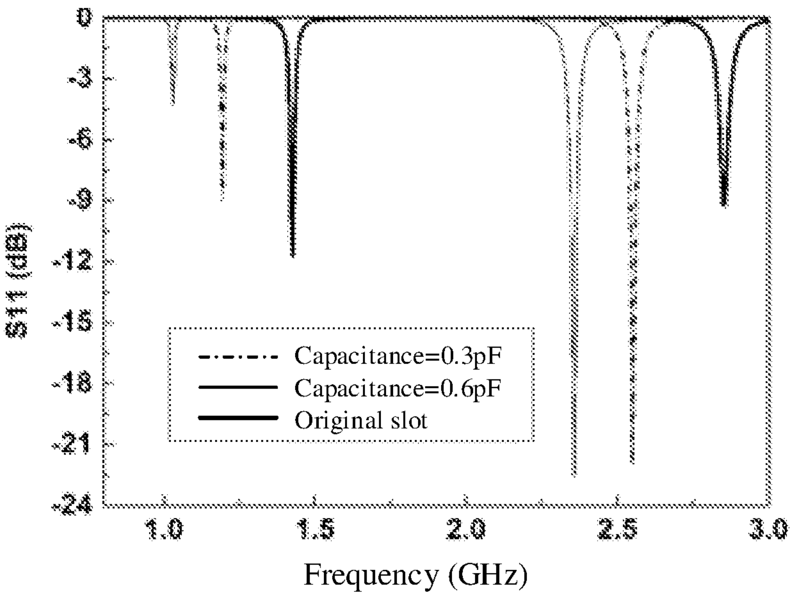
FIG. 13 shows return loss curves at first three order resonance frequencies when a capacitor is provided across point B.
Figure 14:
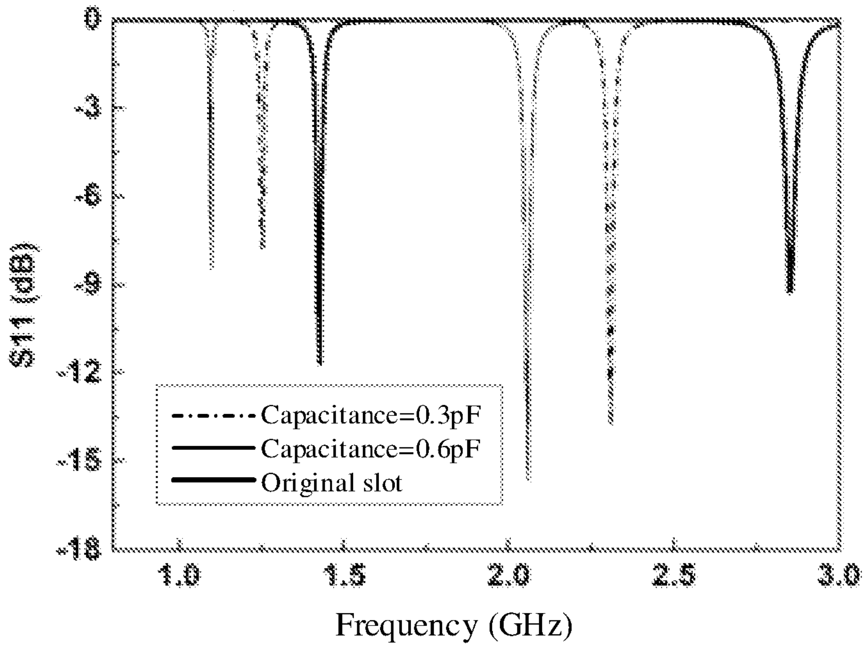
FIG. 14 shows return loss curves at first three order resonance frequencies when a capacitor is provided across point C.
Figure 15:
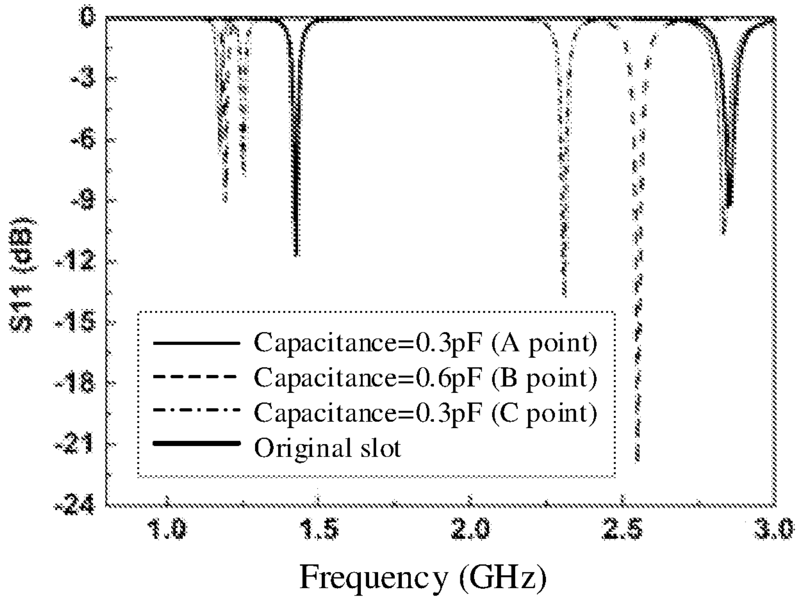
FIG. 15 shows return loss curves of an antenna when capacitors with a fixed capacitance are located at point A, point B, and point C, respectively.

FIG. 12 to FIG. 14 show return loss curves of the antenna when capacitors with different capacitances are disposed at point A, point B, and point C, respectively. It can be seen from FIG. 12 that when the capacitor is disposed at point A, the first-order resonance frequency and the third-order resonance frequency of the antenna are obviously shifted toward the lower frequency along with different capacitances, but the shift of the second-order resonance frequency toward the lower frequency is not obvious.

With reference to FIG. 11, it can be seen that at point A, the voltages are the maximum at the first-order resonance frequency and the third-order resonance frequency of the antenna, while the voltage is zero at the second-order resonance frequency. According to the above-mentioned rules of the effect of capacitors on the resonance frequency, it can be seen that the greater the voltage is, the stronger the effect of the capacitor is, and the more obvious the effect of the corresponding resonance frequency shifting toward the lower frequency is, which explains the result shown in FIG. 11. For example, the third-order resonance frequency changes from 4.28 GHz without the capacitor to 3.20 GHz for a capacitance 0.3 pF and to 2.76 GHz for a capacitance 0.6 pF, while the frequency of the second-order resonance frequency does not change much along with the change of capacitance, and is always around 2.86 GHz.

Comparing the result of FIG. 13 to that of FIG. 14, when the capacitor is disposed at point B, a difference between a ratio of the shift of the first-order resonance frequency of the antenna toward the lower frequency and a ratio of the shift of the second-order resonance frequency of the antenna toward the lower frequency is small, but when the capacitor is disposed at point C, an amplitude of the first-order resonance frequency of the antenna shifted toward the lower frequency is obviously less than an amplitude of the second-order resonance frequency shifted toward the lower frequency. This result can also be explained by a difference in voltage applied at two electrodes of the capacitor. As shown in FIG. 11, since the voltage at point C at the second-order resonance frequency of the antenna is higher than the voltage at point C at the first-order resonance frequency of the antenna, when the capacitor is disposed at point C, the impact of the capacitor on the second-order resonance frequency of the antenna is greater than the impact of the capacitor on the first-order resonance frequency of the antenna. Similarly, as shown in FIG. 11, the voltage at point B at the first-order resonance frequency of the antenna is similar as the voltage at point B at the second-order resonance frequency, and the result in FIG. 13 can be explained, that is, the adjustment degree or ratio of the capacitor to the first-order resonance frequency and to the second-order resonance frequency of the antenna is almost the same.

In order to better understand the results of FIG. 12 to FIG. 14, FIG. 15 shows return loss curves at a first-order resonance frequency and a second-order resonance frequency when a capacitor with a fixed capacitance of 0.3 pF is disposed at point A, point B, and point C, respectively. It can be seen from the results in FIG. 15 that, the shift of the second-order resonance frequency toward the lower frequency has following features: a frequency shift ratio is the minimum when the capacitor is disposed at point A, the frequency shift ratio is the second minimum when the capacitor is disposed at point B, and the frequency shift ratio is maximum when the capacitor is disposed at point C. This is because the voltage at the second-order resonance frequency of the antenna is always increasing during the change of the position of the capacitor from point A to point C.

It can be seen from the results in FIG. 12 to FIG. 14 that the capacitance of the capacitor also affects the ratio of shift of the resonance frequency of the antenna toward lower frequency. In other words, the capacitance of the capacitor is larger, the effect of the resonance frequency shifted toward the lower frequency is more obvious, but the efficiency of the antenna is more affected. Therefore, the capacitance should be as small as possible on the premise of realizing the effect of shifting toward the lower frequency, so as to ensure the antenna efficiency meanwhile.

The above exploration of the features of adjusting the multiple orders of resonance frequencies with the capacitor at different positions, can be regarded as, theoretical guidance for adjusting the first-order resonance frequency and the second-order resonance frequency having a frequency multiplication relationship to two target resonance frequencies without the frequency multiplication relationship in the present disclosure.

In some implementations, taking the smart watches shown in FIG. 8 and FIG. 9 as an example, during the design of a dual-frequency GPS satellite positioning antenna in an original antenna structure, by providing a capacitor across the original Bluetooth antenna, and using the abovementioned research to adjust the position of the capacitor, so that the first-order resonance frequency of the antenna is about 1.176 GHz required by a GPS L5 antenna, and the second-order resonance frequency is about 2.4 GHz required by a Bluetooth antenna. In this way, combined with the original GPS L1 antenna, a dual-frequency GPS satellite positioning antenna can be designed in the limited casing space of a watch.

Figure 16:
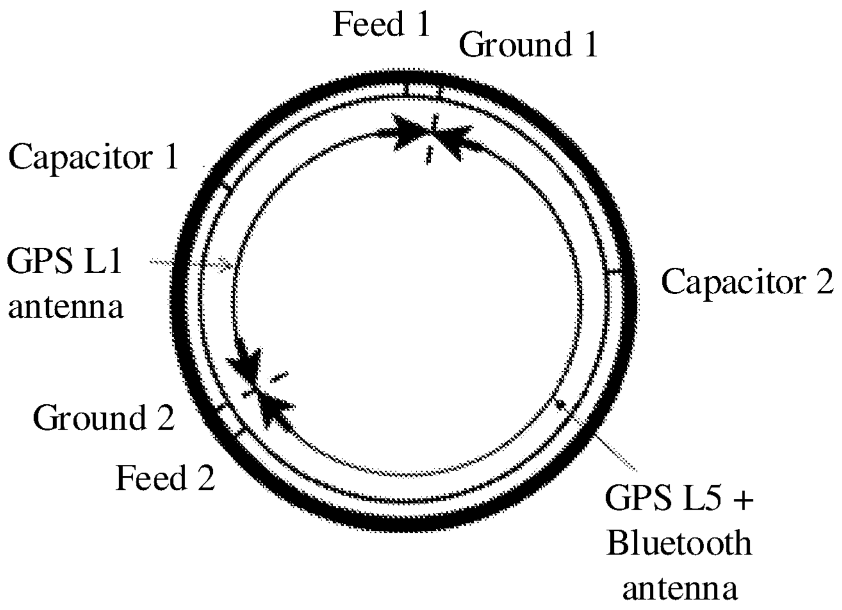
FIG. 16 is a structural example diagram of an antenna structure of a smart watch in FIG. 8.

In an example, the antenna design of the smart watch in the implementations of the present disclosure is shown in FIG. 16. In this example, a relatively short arc length on the left side is the GPS L1 antenna, that is, the slot antenna formed by "Ground 1-Feed 1-Capacitor 1-Ground 2" is configured as the GPS L1 antenna, and its central resonance frequency is 1.575 GHz. The relatively long arc length on the right side is the GPS L5 and the Bluetooth antenna, that is, the slot antenna formed by "Ground 2-Feed 2-Capacitor 2-Ground 1" is configured as the GPS L5 and the Bluetooth antenna, of which the first-order resonance frequency is 1.176 GHz, and the second-order resonance frequency is 2.4 GHz.

In this example, for the GPS L1 antenna, capacitor 1 is also provided across inside of the slot, thereby reducing a slot length of the GPS L1 antenna, and a position of the capacitor 1 is at a position where a voltage is the maximum at the first-order resonance frequency of the antenna, the consideration of which can be referred to above description, and will not be repeated here.

For the GPS L5 and the Bluetooth antenna, the purpose of providing a capacitor 2 across inside of the slot is not only to use the capacitor 2 to extend an effective electrical length of the slot antenna, but also to adjust, by adjusting the position of the capacitor 2 reasonably, both the first-order resonance frequency and the second-order resonance frequency which two have frequency multiplication relationship to available target frequencies. How to adjust the position of the capacitor 2 will be described below in conjunction with FIG. 17.

Figure 17:
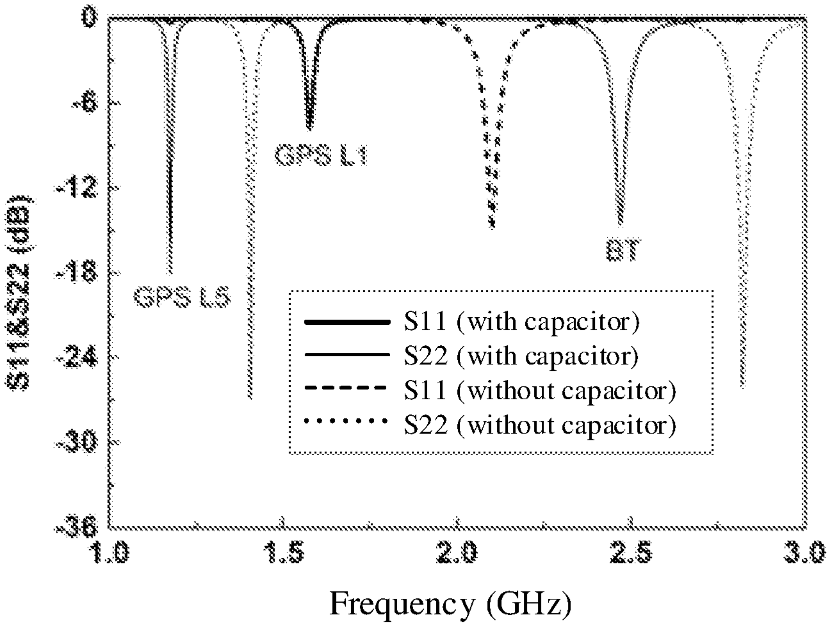
FIG. 17 shows a return loss curve of an antenna without a capacitor across the slot and a return loss curve of an antenna with a capacitor across the slot.

FIG. 17 shows return loss curves of an antenna of a watch without a capacitor, with capacitor 1, and with capacitor 2 across inside of the slot antenna, respectively. It can be seen from the results in FIG. 17 that when no capacitor is bridged, the antenna with a shorter arc length on the left side has a first-order resonance frequency of 2.1 GHz (shown as dotted line S11), while the antenna with a longer arc length on the right side has a first-order resonance frequency of 1.408 GHz and a second-order resonance frequency of 2.821 GHz (shown as dotted line S22), respectively. Obviously, the resonance frequencies generated by the slot antenna with the two different arc lengths are much higher than target resonance frequencies. By providing a capacitor 1 of 0.65 pf and a capacitor 2 of 0.68 pf, the first-order resonance frequency of the antenna with the shorter arc length on the left can be adjusted to a resonance frequency required by GPS L1 antenna (shown as solid line S11), and the first-order resonance frequency and the second-order resonance frequency distribution of the antenna with the longer arc length on the right can be adjusted to a resonance frequency required by GPS L5 antenna and a resonance frequency required by Bluetooth(BT) antenna (shown as solid line S22).

The antenna with the shorter arc length on the left configured with the capacitor 1 has a GPS L1 antenna with an operating frequency of 1.575 GHz. Therefore, in some implementations, according to the above-mentioned considerations, the position of the capacitor 1 is disposed at a position where a current is zero at the first-order resonance frequency of the antenna, or a position where a voltage is the maximum at the first-order resonance frequency of the antenna, such as, for example, a midpoint position of a length of the slot.

For the position of capacitor 2, as can be seen from the above descriptions, the resonance frequency of the antenna can be adjusted with reference to the following considerations during antenna design. A first difference value between an original value of the first-order resonance frequency of the antenna and a value of an operating frequency of the GPS L5 antenna is calculated, a second difference value between an original value of the second-order resonance frequency and a value of an operating frequency of the Bluetooth antenna is calculated, and the first difference value and the second difference value are compared. If the first difference value is greater than the second difference value, it means that a tuning amplitude of the first-order resonance frequency is larger, and the capacitor should be disposed at a position where a voltage at the original value of the first-order resonance frequency is greater than a voltage at the original value of the second-order resonance frequency. On the contrary, if the second difference value is greater than the first difference value, it means that a tuning amplitude of the second-order resonance frequency is larger, and the capacitor should be disposed at a position where a voltage at the original value of the second-order resonance frequency is greater than a voltage at the original value of the first-order resonance frequency. For example, in this example, the tuning amplitude of the second-order resonance frequency is relatively large, and the position of the capacitor 2 is adjustable between point $B_1$ and point C, where the point $B_1$ corresponds to a position where a voltage at the first-order resonance frequency of the antenna is equal to a voltage at the second-order resonance frequency of the antenna.

Figure 18:
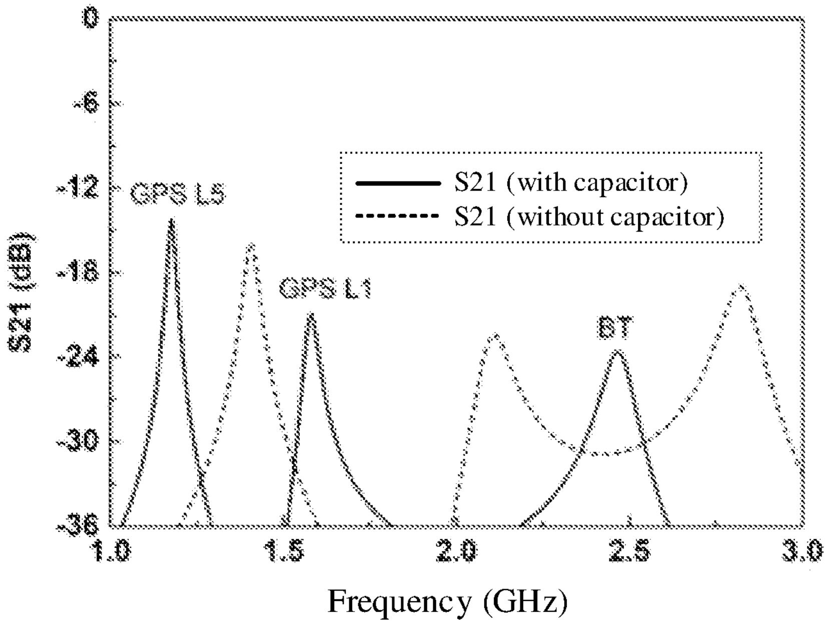
FIG. 18 shows variation curves of isolation degrees between antennas.

FIG. 18 shows variation curves of isolation degrees (S21) between two slot antennas in the above-mentioned antenna structure of a smart watch. It can be seen from FIG. 18 that, in a case that there is a capacitor, an isolation degree between the two slot antennas is better than −14.5 db. Such a good isolation degree indicates that the two antennas can be adjusted and optimized independently, that is, when a capacitor used in one slot antenna changes, an impact of the change on the resonance frequency of the other slot antenna can be ignored. Thus, with the antenna structure of the present disclosure, the two slot antennas can be adjusted and optimized independently. In addition, in the implementation of the present disclosure, the use of capacitor 1 and capacitor 2 is equivalent to reducing the diameter of the watch by about 53%, making it possible to design a dual-frequency GPS satellite positioning antenna on a watch with a typical size.

The above examples are used only to explain and illustrate the antenna structures and the methods for adjusting resonance frequencies of antennas of the present disclosure, and are not intended to limit the present disclosure. On the basis of the above examples, the antenna structure of the smart watch of the present disclosure may also have other alternative implementations.

Figure 19:
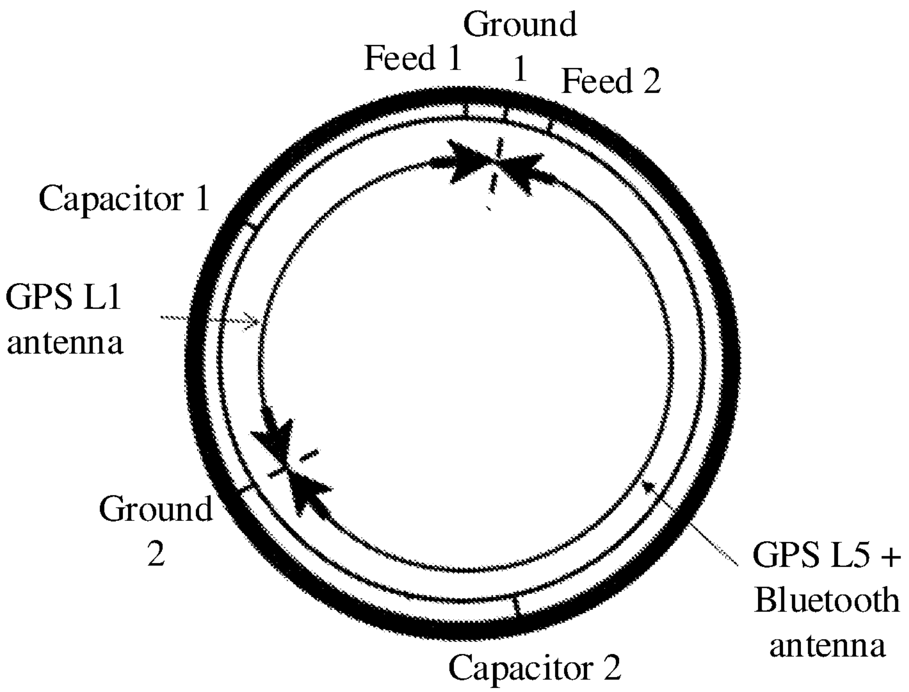
FIG. 19 is another structural example diagram of an antenna structure of a smart watch.

In an alternative example, as shown in FIG. 19, the position of the feed terminal can be adjusted according to the design requirements. For example, two feed terminals, Feed 1 and Feed 2, are disposed close to Ground 1, and the above-mentioned solution can also be achieved. The structure of the antenna is similar as the example in FIG. 16, which can be configured by those skilled as required.

Figure 20:
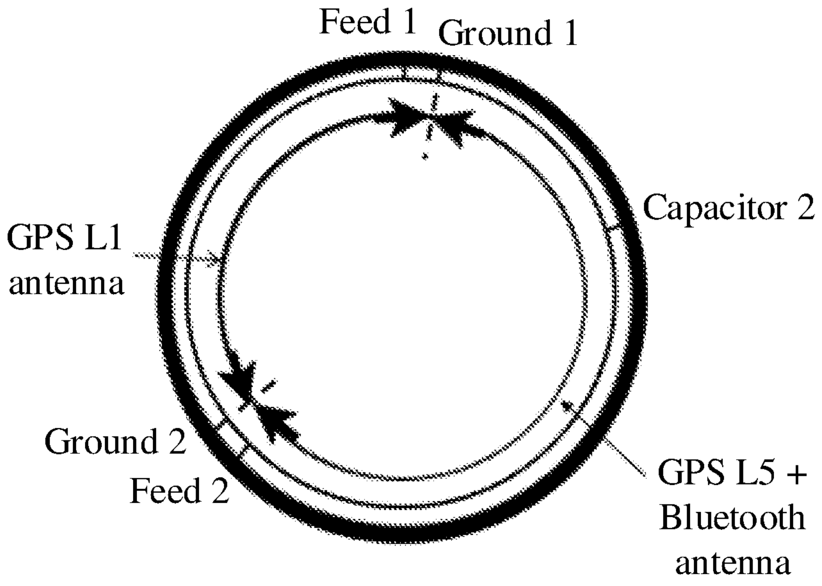
FIG. 20 is yet another structural example diagram of an antenna structure of a smart watch.

In another alternative example, as shown in FIG. 20, it can be seen that there is no capacitor provided in the GPS L1 antenna. It can be seen from the above-mentioned description that, since the GPS L1 antenna is a single-frequency antenna, the function of the capacitor is mainly to extend the effective electrical length of the slot antenna. Therefore, if the size of the watch allows, the GPS L1 antenna can be a conventional slot antenna without bridging a capacitor.

Figure 21:
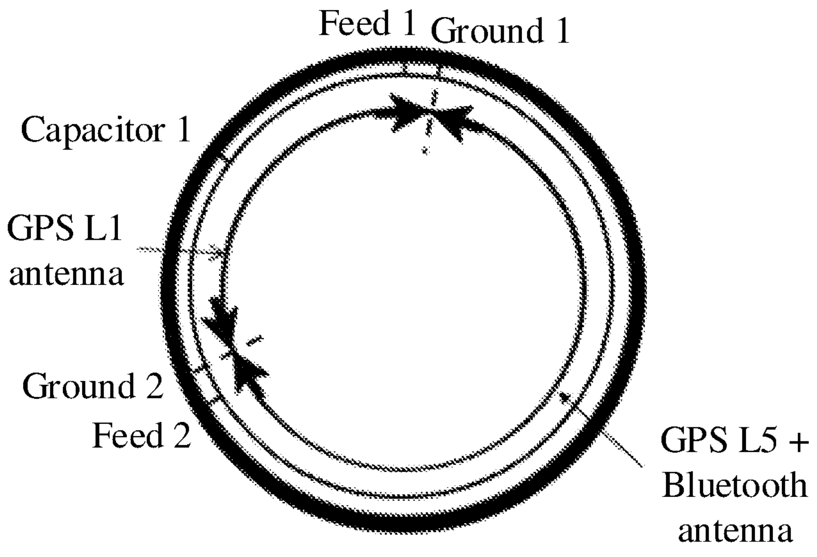
FIG. 21 is yet another structural example diagram of an antenna structure of a smart watch.

In another alternative example, as shown in FIG. 21, it can be seen that a capacitor 1 is provided across the GPS L1 antenna, while the slot antenna that forms the GPS L5 and the Bluetooth antenna is not provided with a capacitor. Considering that the operating frequency of the GPS L5 antenna being 1.176 GHz and the operating frequency of the Bluetooth antenna being 2.4 GHz have an approximate frequency multiplication relationship. Therefore, in an antenna that does not require high accuracy, the GPS L5 antenna and Bluetooth antenna can be realized by using the first two resonance frequencies of the antenna without bridging capacitors. In this example, if capacitor 1 is not provided across the GPS L1 antenna, the slot length of the GPS L1 antenna already occupies most of the space of the watch, and there is no more space for arranging the GPS L5 antenna with a longer slot length. Therefore, it is challenging to design a dual-frequency GPS antenna in the all-metal watch without adopting an antenna structure such as the ones described in the present disclosure.

Figure 22:
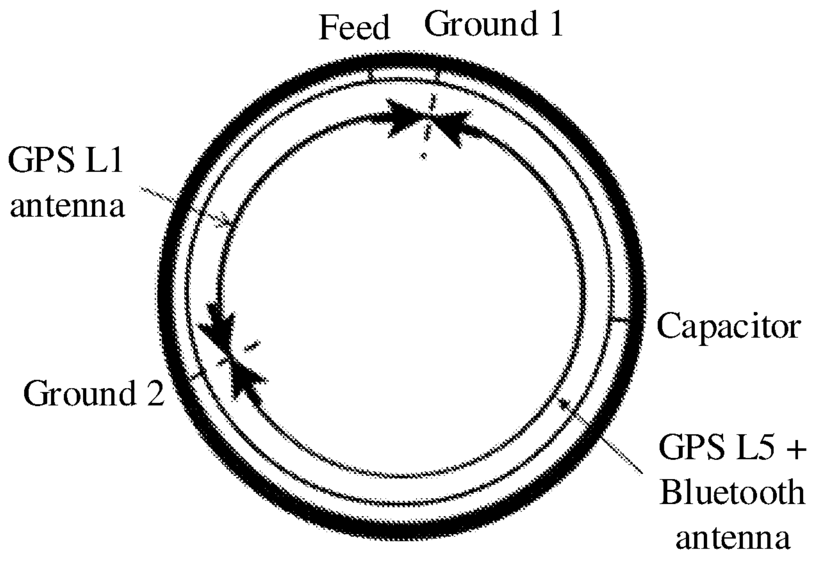
FIG. 22 is yet another structural example diagram of an antenna structure of a smart watch.

In yet another alternative example, as shown in FIG. 22, two slot antennas use a same feed terminal for radiation, of which configuration is basically the same as the example in FIG. 16, a difference lies in that a number of the feed terminals is reduced, so that the internal circuit structure can be further optimized.

Figure 23:
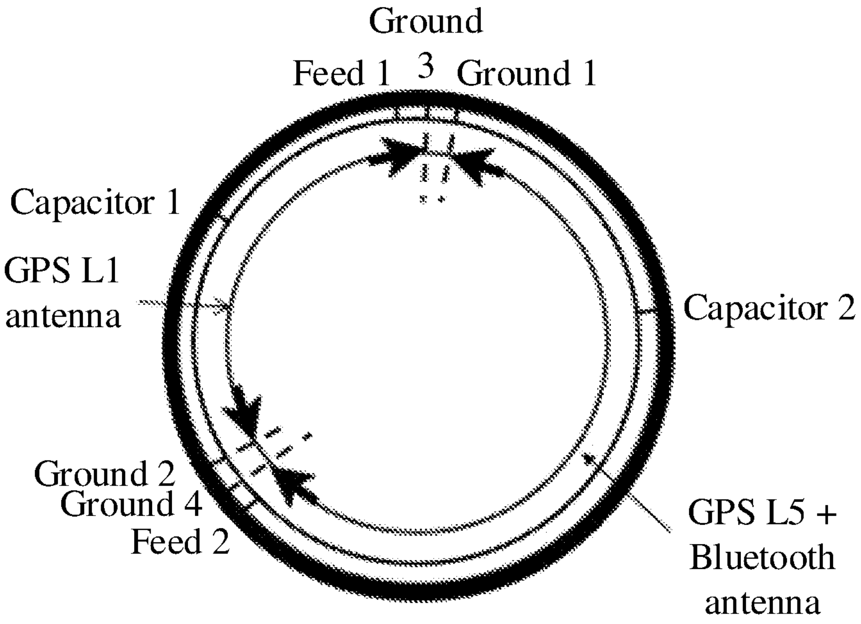
FIG. 23 is yet another structural example diagram of an antenna structure of a smart watch.

In another alternative example, as shown in FIG. 23, in the case that the size of the watch allows, the two slot antennas can have better isolation degree by increasing a number of grounding points. That is, the slot antenna formed by "Ground 3-Feed 1-Capacitor 1-Ground 2" is taken as the GPS L1 antenna, and the slot antenna formed by "Ground 4-Feed 2-Capacitor 2-Ground 1" is configured to form the GPS L5 and the Bluetooth antenna.

The above description has illustrated the watch antenna structure in the implementations of the present disclosure.

a) The antenna structure of the present disclosure is not limited to a smart watch, but can be any other terminal device with an all-metal casing suitable for forming the antenna structure, such as a mobile phone, a wristband, etc., which will not be enumerated.

b) The antenna structure of the present disclosure is not limited to the above-mentioned types of antennas. It can be applied to slot antennas of any type, such as a 4G LTE antenna, a 5G antenna, etc., which is not limited in the present disclosure.

c) The multi-frequency antenna structure is not limited to the above-mentioned GPS L5 and Bluetooth antenna. Any other antennas whose operating frequencies with high-low frequency relationships can theoretically be adjusted by using the antenna structure of the present disclosure. For example, the GPS L1 antenna and the Bluetooth antenna can also be designed in a same slot antenna. For another example, the GPS L1 antenna and the GPS L5 antenna can be designed in a same slot antenna. For another example, a low frequency band and a high frequency band of a 4G antenna or of a 5G antenna can be designed in a same slot antenna. The present disclosure does not limit thereto.

d) The use of the resonance frequency of the antenna structure is not limited to the first two orders of the resonance frequencies, but can also be any available resonance frequencies suitable for adjustment, such as the first three orders of the resonance frequencies, any two orders of the resonance frequencies or any three orders of the resonance frequencies, which is not limited in the present disclosure.

e) The configuration of the antenna structure not described in detail in this disclosure, such as, for example, filling the slot of the slot antenna with a dielectric material can extend the effective electrical length of the slot antenna, or the slot is sealed, can be set by those skilled in the art according to the specific implementations of the present disclosure, which will not be repeated herein.

In addition to the above-mentioned effects by applying the antenna structure of the present disclosure, increase of the resonance frequency bandwidth can be achieved by, for example, adjusting positions of the capacitor. This is also one of considerations of the present disclosure, which is briefly described herein.

As shown in FIG. 12, when the capacitor is provided at point A, since a voltage is zero at the second-order resonance frequency at point A, the second-order resonance frequency does not change significantly. Referring to FIG. 12, it can be seen that when the capacitance is 0.6 pF, the third-order resonance frequency is reduced close to the second-order resonance frequency. In other words, by adjusting the capacitance, the third-order resonance frequency can be reduced to the same as the second-order resonance frequency, which is equivalent to widening a bandwidth of the second-order resonance frequency, thereby greatly improving the antenna efficiency of the second-order resonance frequency. It can be seen that the antenna structure of the present disclosure can also improve the resonance frequency bandwidth by adjusting the position of the capacitor.

The antenna structures and principles of the implementations of the present disclosure are described above in detail. In a second aspect, an implementation of the present disclosure further provides a method of adjusting an antenna resonance frequency of the above-mentioned antenna structure, the method includes: providing a capacitor in a first slot, two electrodes of the capacitor being respectively connected with two sides of the first slot in a width direction; where in a length direction of the first slot, the capacitor is located at a position where a voltage is the maximum at an original value of the resonance frequency of the slot antenna; obtaining an original value of a first resonance frequency of the slot antenna; obtaining a difference between the original value of the first resonance frequency and a corresponding target value; adjusting a length of the first slot according to the difference to make the original value of the resonance frequency of the slot antenna equal to the corresponding target value.

In some implementations, when designing the antenna structure, the capacitor is fixed at the midpoint of the slot, and the length of the slot can be adjusted, so that an operating frequency of the antenna structure is equal to the target frequency. At this time, the length of the slot is the shortest slot length at the target frequency, thereby reducing the physical space occupied by the antenna. The method of adjusting the resonance frequency of the antenna is applicable for scenarios where a slot length of the slot antenna needs to be reduced as much as possible, and also makes it possible to realize the antenna structure in a device with a smaller volume.

In a third aspect, implementations of the present disclosure provide a method of adjusting an antenna resonance frequency of the above-mentioned antenna structure, including: obtaining an original value of a second resonance frequency of a slot antenna; obtaining a difference between the original value of the second resonance frequency and a corresponding target value; providing a second capacitor in a second slot, two electrodes of the second capacitor being respectively connected with two sides of the second slot in a width direction; and in a length direction of the second slot, adjusting a position of the second capacitor according to the difference to make the original value of the resonance frequency of the slot antenna is equal to the corresponding target value.

In some implementations, when designing the antenna structure, when the length of the slot is determined, the position of the second capacitor in the slot can be adjusted to make the operating frequency of the antenna structure shift toward the lower frequency, so that the operating frequency of the antenna structure is reduced to the target frequency without changing the slot length. This method of adjusting the resonance frequency of the slot antenna is applicable to the antenna structure with limited physical length of a slot, by extending the effective electrical length of slot antenna, the antenna structure that supposedly could not be realized at this length can be realized.

And the method of adjusting the resonance frequency of the antenna is applicable for the design of multi-frequency antenna. When the operating frequency of the slot antenna includes multiple orders of resonance frequencies, adjusting the position of the second capacitor according to the difference to make the original value of the resonance frequency of the slot antenna equal to the corresponding target value includes: adjusting the position of the second capacitor according to differences between an original value of each order resonance frequency and a corresponding target value to make each order resonance frequency of the slot antenna adjust from the original value to the corresponding target value. For the adjustment of the position of the second capacitor, referring to the above-mentioned, and there is no need to repeat here.

In a fourth aspect, the present disclosure further provides a wearable device including the antenna structure according to any one of the foregoing implementations. The wearable device can be any device suitable for implementation, such as a smart phone, a smart watch, a smart wristband, and the like. Since the antenna structure of the implementation of the present disclosure is to reduce a length of the slot in the metal casing, it has a better effect on a device with a smaller volume. For example, in an example, the wearable device is a smart watch or a smart wristband, so that an effective length of the slot of the antenna structure is increased, making it possible to design an antenna that could not be originally designed on a watch or wristband with an all-metal casing.

The above-mentioned implementations are only examples for clear description, and are not intended to limit the implementations. For those of ordinary skill in the art, changes or modifications in other different forms can also be made on the basis of the above description. There is no need and cannot be exhaustive of all implementations here. However, obvious changes or variations derived from the present disclosure are still within a protection scope of the present disclosure.

What is claimed is:

1. A terminal device, comprising:
a metal casing comprising a bottom casing and a side frame; and
a first slot antenna and a second slot antenna provided in the side frame of the metal casing,
wherein at least one of the first slot antenna or the second slot antenna is a slot antenna comprising:
a slot provided in the metal casing, the slot having a first end and a second end opposite to the first end in a length direction of the slot;
a feed terminal provided across the slot and located between the first end and the second end; and
a capacitor provided in the slot, two electrodes of the capacitor being respectively connected with two sides of the slot in a width direction of the slot, and the capacitor being configured to adjust a resonance frequency of the slot antenna from an original value to a corresponding target value, and
wherein at least one of the first slot antenna or the second slot antenna is a multi-frequency slot antenna, and a slot length direction of the first slot antenna and a slot length direction of the second slot antenna are parallel to the bottom casing.

2. The terminal device of claim 1, wherein:
the first slot antenna and the second slot antenna are connected end to end in the side frame.

3. The terminal device of claim 1, wherein a shape of the side frame comprises:
a circular ring, a rectangle, a rounded rectangle or a diamond.

4. The terminal device of claim 1, wherein the first slot antenna and the second antenna have different slot lengths.

5. The terminal device of claim 1, wherein the feed terminal of the first slot antenna is provided close to a ground terminal of the second slot antenna, and a ground terminal of the first slot antenna is provided close to the feed terminal of the second slot antenna.

6. The terminal device of claim 1, wherein,
the first slot antenna is configured to form a Global Positioning System (GPS) L1 antenna, and
the second slot antenna is configured to form a GPS L5 antenna and a Bluetooth or a short range wireless antenna for 2.4 GHz.

7. The terminal device of claim 1, a first order resonance frequency of the first slot antenna is an operating frequency of the GPS L1 antenna.

8. The terminal device of claim 1, a first capacitor is provided in the middle of the slot of the first slot antenna in the length direction.

9. The terminal device of claim 1, the target value of the first order resonance frequency of the second slot antenna is an operating frequency of the GPS L5 antenna, and the target value of the second order resonance frequency of the second slot antenna is 2.4 GHz.

10. The terminal device of claim 1, a second capacitor is provided in the slot of the second slot antenna, and the position of the second capacitor is between a position, where a voltage of the second slot antenna at the original value of the first order resonance frequency is equal to a voltage of the second slot antenna at the original value of the second order resonance frequency, and a position where the second slot antenna has the maximum voltage at the original value of the second order resonance frequency.

11. The terminal device of claim 1, wherein the terminal device is a wearable device.

12. The terminal device of claim 1, wherein the terminal device is a smart watch.

13. The terminal device of claim 1, wherein the resonance frequency of the slot antenna comprises a first resonance frequency and a second resonance frequency;
a difference between an original value of the first resonance frequency and a target value of the first resonance frequency is a first difference value, a difference between an original value of the second resonance frequency and a target value of the second resonance frequency is a second difference value; and
a position of the capacitor depends on the first difference value and the second difference value.

14. The terminal device of claim 1, wherein the first slot antenna is a single-frequency slot antenna, and the second slot antenna is a multi-frequency slot antenna.

15. A terminal device, comprising:
a metal casing comprising a bottom casing and a side frame; and
a first slot antenna and a second slot antenna provided in the side frame of the metal casing,
wherein at least one of the first slot antenna or the second slot antenna is a multi-frequency slot antenna, the multi-frequency slot antenna comprising:
a slot provided in the metal casing, the slot having a first end and a second end opposite to the first end in a length direction of the slot;
a feed terminal provided across the slot and located between the first end and the second end; and
a capacitor provided in the slot, two electrodes of the capacitor being respectively connected with two sides of the slot in a width direction of the slot, and the capacitor being configured to adjust an order of resonance frequency of the multi-frequency slot antenna from an original value to a corresponding target value, and
wherein the feed terminal of the first slot antenna is provided close to a ground terminal of the second slot antenna, and a ground terminal of the first slot antenna is provided close to the feed terminal of the second slot antenna.

16. A terminal device, comprising:
a metal casing comprising a bottom casing and a side frame; and
a first slot antenna and a second slot antenna provided in the side frame of the metal casing,
wherein at least one of the first slot antenna or the second slot antenna is a slot antenna comprising:
a slot provided in the metal casing, the slot having a first end and a second end opposite to the first end in a length direction of the slot;
a feed terminal provided across the slot and located between the first end and the second end; and
a capacitor provided in the slot, two electrodes of the capacitor being respectively connected with two sides of the slot in a width direction of the slot, and the capacitor being configured to adjust an order of resonance frequency of the slot antenna from an original value to a corresponding target value, and
wherein the first slot antenna is configured to form a GPS L1 antenna, and the second slot antenna is configured to form a GPS L5 antenna and a Bluetooth or a short range wireless antenna for 2.4 GHz, the target value of the first order resonance frequency of the second slot antenna being the GPS L5 band, and the target value of the second order resonance frequency of the second slot antenna being 2.4 GHz band.

17. The terminal device of claim 15, wherein the first slot antenna is configured to form a GPS L1 antenna, and the second slot antenna is configured to form a GPS L5 antenna and a Bluetooth or a short range wireless antenna for 2.4 GHz.

18. The terminal device of claim 15, wherein the target value of the first order resonance frequency of the second slot antenna is the GPS L5 band, and the target value of the second order resonance frequency of the second slot antenna is 2.4 GHz band.

19. The terminal device of claim 15, wherein the first slot antenna and the second slot antenna are connected end to end in the side frame.

* * * * *